(12) United States Patent
Leininger

(10) Patent No.: US 8,641,401 B2
(45) Date of Patent: Feb. 4, 2014

(54) COMBINATION SCOOP AND MOLD PRESS FOR DOUGH FISHING BAIT

(76) Inventor: Randall L. Leininger, Sandy, UT (US)

( * ) Notice: Subject to any disclaimer, the term of this patent is extended or adjusted under 35 U.S.C. 154(b) by 528 days.

(21) Appl. No.: 12/420,020

(22) Filed: Apr. 7, 2009

(65) Prior Publication Data

US 2009/0252820 A1     Oct. 8, 2009

Related U.S. Application Data

(60) Provisional application No. 61/042,962, filed on Apr. 7, 2008.

(51) Int. Cl.
    *A01K 85/02*     (2006.01)

(52) U.S. Cl.
    USPC ........... 425/187; 425/116; 425/118; 425/221; 425/276; 425/281; 249/95; 249/170

(58) Field of Classification Search
    USPC ......... 425/116, 117, 118, 218, 221, 276, 278, 425/281, 318, 408, DIG. 57, 187; 249/91, 249/92, 95, 162, 170
    See application file for complete search history.

(56) References Cited

U.S. PATENT DOCUMENTS

| | | | | |
|---|---|---|---|---|
| 436,818 | A * | 9/1890 | Wiatt et al. ................... | 425/318 |
| 1,057,065 | A * | 3/1913 | Krist ............................. | 425/283 |
| 1,323,582 | A * | 12/1919 | Dow ............................. | 425/278 |
| 1,639,122 | A * | 8/1927 | Whitman ..................... | 425/116 |
| 1,698,836 | A * | 1/1929 | Bartley et al. ................ | 249/81 |
| 1,785,797 | A * | 12/1930 | Watson ......................... | 249/64 |
| 1,888,739 | A * | 11/1932 | Sanders ........................ | 425/278 |
| 1,906,882 | A * | 5/1933 | Perret ............................ | 249/137 |
| 2,003,197 | A * | 5/1935 | Jackson ........................ | 425/285 |
| 2,165,941 | A * | 7/1939 | Price ............................. | 425/278 |
| 2,691,190 | A * | 10/1954 | Bethe et al. .................. | 249/170 |
| 2,954,597 | A * | 10/1960 | McFarland ................... | 425/408 |
| 3,079,644 | A * | 3/1963 | Molitor et al. ............... | 264/246 |
| 3,289,246 | A * | 12/1966 | Deye ............................. | 425/276 |
| 3,380,121 | A * | 4/1968 | Chittenden et al. .......... | 425/528 |
| 3,552,711 | A * | 1/1971 | DeLaney et al. ............. | 249/170 |
| 3,836,308 | A * | 9/1974 | Upright ........................ | 425/318 |
| 3,930,329 | A * | 1/1976 | Burkhardt ..................... | 81/423 |
| 3,976,413 | A | 8/1976 | Popeil | |
| 4,161,837 | A * | 7/1979 | Johnston ....................... | 43/4 |
| 4,163,639 | A * | 8/1979 | Stern et al. ................... | 425/318 |
| 4,344,529 | A * | 8/1982 | Ibarzabal ..................... | 206/77.1 |
| 4,440,377 | A * | 4/1984 | Hujik ............................ | 249/119 |
| 4,850,129 | A | 7/1989 | Hoepfner et al. | |
| 4,859,167 | A * | 8/1989 | Maerz et al. ................. | 425/276 |
| 4,905,988 | A * | 3/1990 | Mooneyhan ................. | 482/50 |
| 4,969,811 | A * | 11/1990 | Littleton ...................... | 425/116 |

(Continued)

*Primary Examiner* — Seyed Masoud Malekzadeh
(74) *Attorney, Agent, or Firm* — Angus C. Fox, III

(57) ABSTRACT

A combination scoop and mold press includes two generally cup-shaped half-mold members, which engage one another at mold member edges in mirror-image alignment to form a generally enclosed mold. The half-mold members of the scoop and mold press are carried on opposite ends of a unitary piece of injection molded polymeric material, which has a live hinge joint equidistantly spaced between the mold members. Either of the half-mold members may be utilized to scoop out an appropriate mass of bait dough having at least the volume of the closed mold. At least one of the half-mold members is equipped with a notch or slit through which the shank of a fish hook, or the line which is tied to the fish hook, may pass. Finger pressure is used to bring the mold half-members together, compressing the bait dough around the hook.

14 Claims, 5 Drawing Sheets

(56) References Cited

U.S. PATENT DOCUMENTS

| | | | |
|---|---|---|---|
| 5,080,572 A * | 1/1992 | Sage | 425/276 |
| 5,117,571 A | 6/1992 | Sites | |
| 5,413,472 A * | 5/1995 | Dietterich et al. | 425/183 |
| 5,711,892 A * | 1/1998 | Ramirez | 249/105 |
| 5,741,446 A * | 4/1998 | Tahara et al. | 264/1.9 |
| 5,788,873 A * | 8/1998 | Warsaw | 249/170 |
| 5,891,489 A | 4/1999 | Rockwell | |
| 6,023,818 A * | 2/2000 | Shang | 24/501 |
| 6,185,795 B1 * | 2/2001 | Shui-Shang | 24/507 |
| 6,416,309 B1 * | 7/2002 | Michlitsch et al. | 425/187 |
| 6,474,974 B1 * | 11/2002 | Horng | 425/283 |
| 6,625,920 B1 | 9/2003 | Rockwell | |
| 7,111,331 B2 * | 9/2006 | Cecchin | 4/234 |
| 7,128,556 B2 * | 10/2006 | Wessells et al. | 425/276 |
| 7,461,880 B2 * | 12/2008 | Norton et al. | 294/50.8 |
| 2003/0020202 A1 * | 1/2003 | Ueno et al. | 264/163 |
| 2008/0305327 A1 * | 12/2008 | West et al. | 428/353 |

* cited by examiner

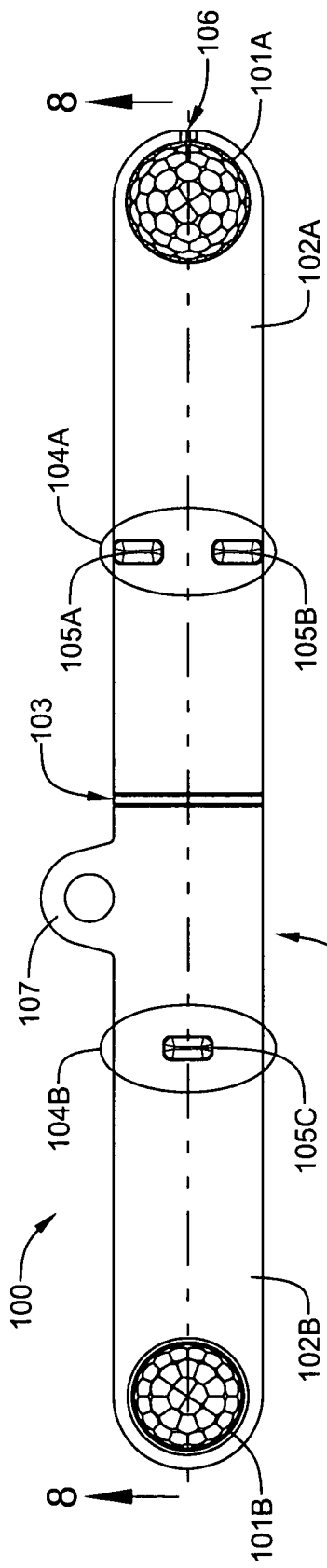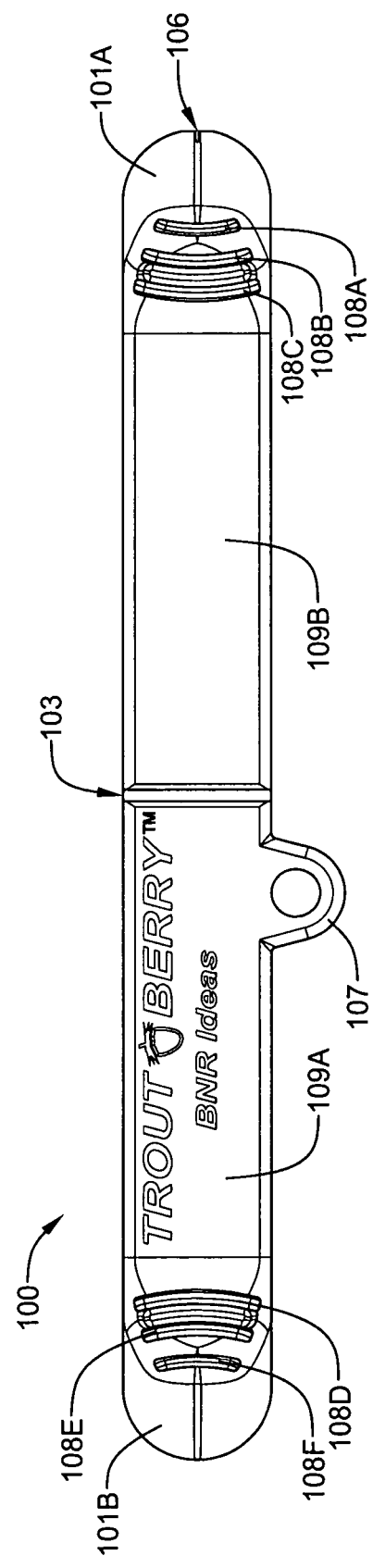

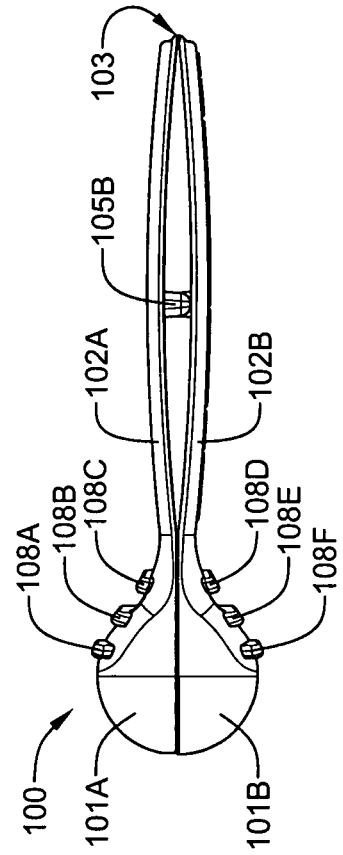
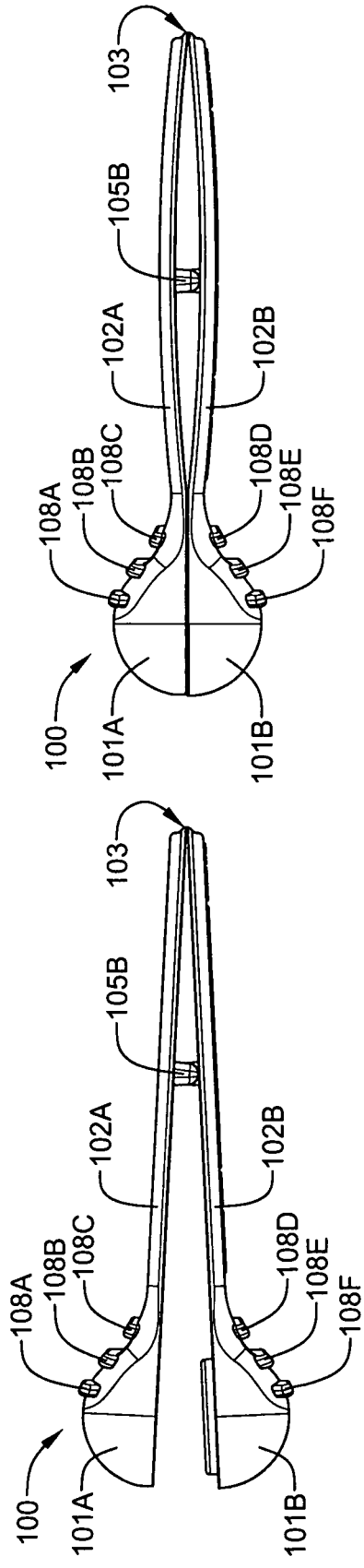

COMBINATION SCOOP AND MOLD PRESS FOR DOUGH FISHING BAIT

This application has a priority date based on the filing of provisional patent application No. 61/042,962, of the same title, on Apr. 7, 2008

FIELD OF THE INVENTION

This invention relates, generally, scoops and molds and, more particularly, to bait molding devices for forming and securing dough bait about a fishhook.

BACKGROUND OF THE INVENTION

One common form of bait used for fishing is dough bait. This type of bait is used by embedding a fishhook within a dough ball or otherwise forming a dough ball around the hook. Most generally, the bait is molded around the entire hook. Although the idea of dough bait originated with bread dough, dough baits have evolved to the point where they are now manufactured from buoyant polymers that are mixed with fish-attractings compounds. Widely available in commerce, some of the more popular dough baits have names such as PowerBait®, Fishnip™, Gulp!®, Big Bite™, and Bee'Jay™.

One of the problems encountered in molding the bait around the hook is providing a compacted mass of dough of sufficient density that it will not separate easily from the hook. The most common method employed by fishermen is simply to compact the dough around the hook with the fingers, with the hope that the dough will have sufficient adhesion to the hook to prevent its rapid loss.

A second problem encountered in molding dough bait around a hook is the danger of skin puncture posed by the barb or barbs on the hook. The problem is exacerbated by the need to apply pressure with the fingers in order to compact the dough. The extraction of barbs on the hook from a resulting puncture wound may require surgery. Infection and scarring are always risks associated with wounds and surgery.

A third problem encountered in hand molding the bait upon the hook is the non-uniformity of shape of the molded bait. It is preferable that the bait molded around the hook be of a size and shape which can be easily swallowed by fish of the type being sought. The hand forming of dough bait results in a high degree of variability, which will often result in less than desirable results.

A fourth problem associated with molding dough bait with the fingers is the presence of human scent on the bait. Fish that have been previously caught and released may be less likely to take the bait if human scent is detected.

Bait molding tools have been developed over the past thirty-some years in multiple attempts to overcome the problems set forth above. Those prior art references will now be disclosed in the order of their development, beginning with the most recent.

U.S. Pat. No. 6,625,920 to Kirk Rockwell, titled DEVICE AND METHOD FOR FORMING FISH BAIT AROUND A FISH HOOK, discloses a mold apparatus having first mold unit with an access port, a second mold unit slidably coupled to a first end of the first mold unit, and a bait supply canister threadably coupled to a second end of the first mold unit. Bait dough is dispensed from the bait supply canister into the first mold unit. With a hook inserted within the first mold unit through the access port, and with the fishing line attached to the hook extending outside the first mold unit through the access port, the second mold unit is slidably moved toward the second end, thereby forming a two-part mold cavity in which the bait dough is compressed around the hook. Once the molding process is complete, the second mold unit is moved to its original position so that the hook and attached bait dough can be removed from the mold apparatus.

U.S. Pat. No. 5,891,489, also to Kirk Rockwell, titled APPARATUS AND METHOD FOR MOLDING FISH BAIT ON A FISH HOOK, discloses a two element fish bait molder that is functionally similar to the device of his later '920 patent.

U.S. Pat. No. 5,117,571 to Richie D. Sites, titled FISH-HOOK BAITING DEVICE, discloses an apparatus having a hook chamber, a reservoir body forming a bait chamber for containing a quantity of bait, the bait chamber being in fluid communication with the hook chamber, and a plunger assembly for compressing the bait from the bait chamber into the hook chamber and extruding the bait through the hook chamber. A hook is placed inside the hook chamber and the hook chamber is closed. The bait is compressed into the hook chamber and onto the hook. The hook chamber is then opened and the baited hook is extruded from the hook chamber. The extruded bait is cut from the bait remaining in the device after the desired amount of bait has been extruded.

U.S. Pat. No. 4,850,129 to Paul A. Hoepfner, et al., titled BAIT FORMING GUN, discloses a pistol-shaped apparatus having a barrel with a pair of diametrically-opposed axial slots and a release plunger. The barrel is forced into a bait dough mass contained in a tray. The barrel is then twisted to sever the bait and encase the fish hook within the bait. The release plunger then expels the baited fish hook.

U.S. Pat. No. 4,161,837 to Gerald M. Johnston, titled FISHING HOOK BAIT MOLD, discloses an apparatus having a pair of mold halves having a pair of mating faces, which are pivotably secured together. When closed, a pair of interconnected open-mouth cavities are formed. One of the cavities, which is smaller in diameter than the other, receives the shank end of a fish hook and the knotted end of the fishing line. The barbed end of the hook is installed within the larger diameter cavity. Pliable bait dough is forced into the open mouth portion of the barb containing cavity such that dough is formed tightly about the fish hook. The mold is then opened to release the baited hook.

U.S. Pat. No. 3,976,413 to Samuel Joseph Popeil, titled ADJUSTABLE FISH BAIT FORMING DEVICE, discloses a bait forming device having a body, a pusher, a tip, an adjusting screw, an adjustment knob, the same being assembled in sequential order of tip and body, pusher within the body, an adjustment knob being at the end of the body remote from the tip. A piston is provided to reciprocate within a cylinder defined at the tip, beginning at a predetermined position within the cylinder so that a bait may be formed of infinitely variable length within the confines of the structure by pressing the tip into the bait, removing the same, and then actuating the pusher to remove the bait.

U.S. Pat. No. 3,930,329 to John B. Burkhardt, titled BAIT MOLDING DEVICE, discloses a device having a pair of opposed jaws that is much like single-hole paper punch pliers. A hemispherical half mold is mounted on each jaw of the pliers, and the molds mate to form a sphere. A notch in one of the molds enables a fish hook attached to a line to be installed between the mold halves. With the hook in place, dough is compressed between the mold halves.

All of the bait dough molds heretofore described are relatively complex, heavy, and expensive to manufacture. What is needed is a bait dough mold that eliminates those drawbacks—one that is simple, lightweight, and extremely inexpensive to manufacture.

SUMMARY OF THE INVENTION

It is the objective of the present invention to provide a combination scoop and mold press for dough fishing bait, which will form moldable bait dough material around a fish-hook in a desired shape, while also creating the necessary molding pressures to promote optimum adhesion of the dough material upon the hook.

The present invention fulfills the aforesaid objective by providing a one-piece, injection-molded combination scoop and mold press (hereinafter "CSMP"), which includes a pair of generally hemispherical, cup-shaped, or hemi-ovoid half-mold members attached to opposite ends of an arm member which incorporates a live hinge in the center thereof. When the arm member is bent at the live hinge, the half-arms thereof are brought from a straight angle to an acute angle so that the half-mold members engage one another in mirror-image alignment to form a generally enclosed mold. At least one of the half-mold members is equipped with a notch or slit on an engaging peripheral edge thereof through which the shank of a fish hook, or the line which is tied to the fish hook, may pass, with the barbed end of the hook positioned, in either case, within the mold. One of the cup-shaped half-mold members may be utilized to scoop out an appropriate amount of bait dough having at least the volume of the generally enclosed mold. The CSMP is preferably injection molded from a polymer resin, such as polypropylene, which has excellent flexibility and low-fatigue characteristics so that the live hinge can be bent thousands of times without failure.

In order to facilitate the mirror-image alignment of the half-mold members, two sets of alignment stops are positioned on the side of the arm member which fold together about the live hinge. The alignment stop sets are positioned on opposite sides of the live hinge and equidistant therefrom. When the arm is folded to bring the half-mold members into mirror-image alignment, the alignment stops mesh so that the half-mold members are aligned as they come together. For a preferred embodiment of the invention, one of the alignment stop sets includes a pair of spaced-apart protrusions that project from the arm. The other set includes a single protrusion which fits between the protrusions of the other set. The alignment stops prevent the half-mold members from being brought together completely without flexing the half arm members which couple the half-mold members to the live hinge. As there is considerable resilience in each of the half arms, the arms will spring open to release the bait once the user releases pressure on the half-mold members. If alignment stops were not provided, it is likely that the half-mold members would be retained in a closed configuration after pressing and molding the dough material by the stickiness of the molded dough bait.

In order to increase surface area for a given mass of dough bait, the interior surface of each half-mold member is textured. The texture may include an array of dimples, an array of protrusions, facets, a matrix of grooves, or a combination of two or more texture features.

Optional lateral ribs can be provided beneath each half-mold member to assist a user in gripping the device while bringing the half-mold members together as the dough material is molded into bait. In addition, the lateral ribs assist a user in gripping the device when one of the half-mold members is employed as a dough scoop. The CSMP may also be equipped with a keyring loop, as well as with at least one planar area on one or both arms which may be printed the product trademark, supplier information, or company advertising.

BRIEF DESCRIPTION OF THE DRAWINGS

FIG. 5 is a top plan view of the unfolded combination scoop and mold press;

FIG. 6 is a bottom plan view of the unfolded combination scoop and mold press;

FIG. 9 is elevational view of the slotted end of the combination scoop and mold press;

FIG. 10 is an elevational view of the non-slotted end of the combination scoop and mold press;

FIG. 11 is a side elevational view of the folded combination scoop and mold press showing the side thereof opposite the keyring loop, with the live hinge flexed and the alignment stops brought together, but with the arms unflexed and the mold halves spaced apart; and FIG. 12 is a side elevational view of the folded combination scoop and mold press showing the side thereof opposite the ring loop, with the live hinge flexed, the alignment stops brought together, and the arms flexed to bring the mold halves together.

PREFERRED EMBODIMENT OF THE INVENTION

Figure 1:
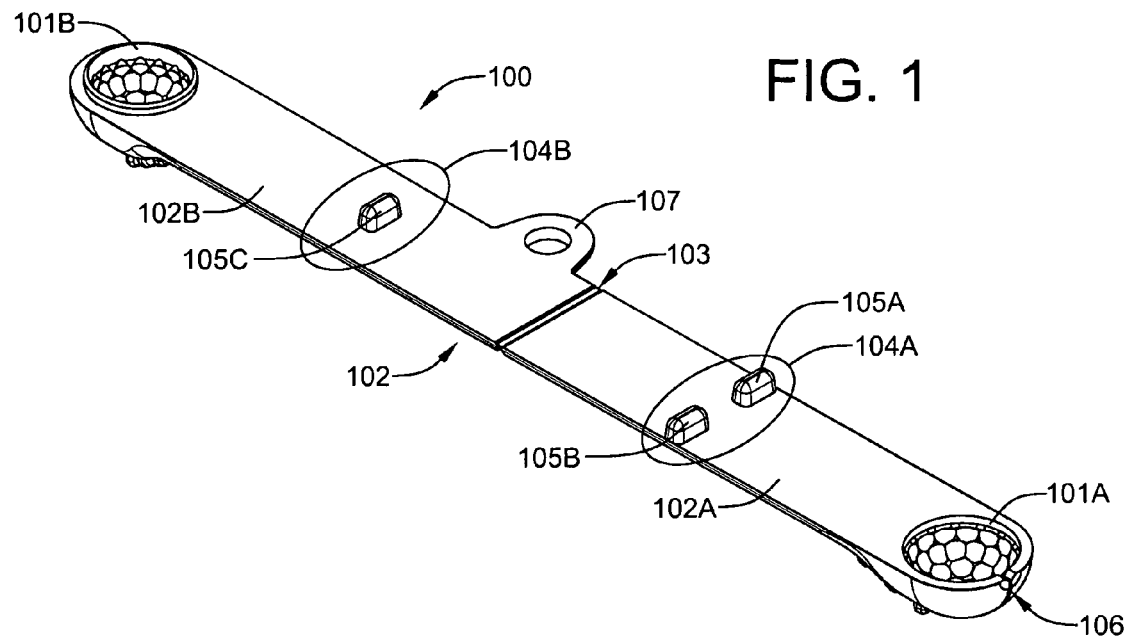
FIG. 1 is an isometric upper/slotted end view of the unfolded combination scoop and mold press for bait dough.
Figure 2:
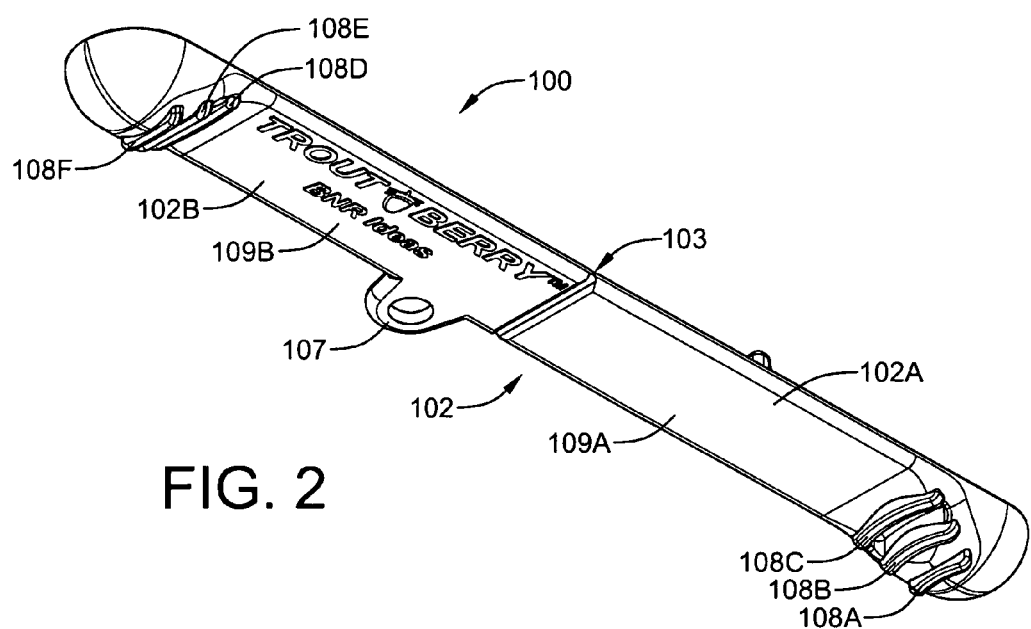
FIG. 2 is an isometric lower/non-slotted end view of the unfolded combination scoop and mold press.
Figure 3:
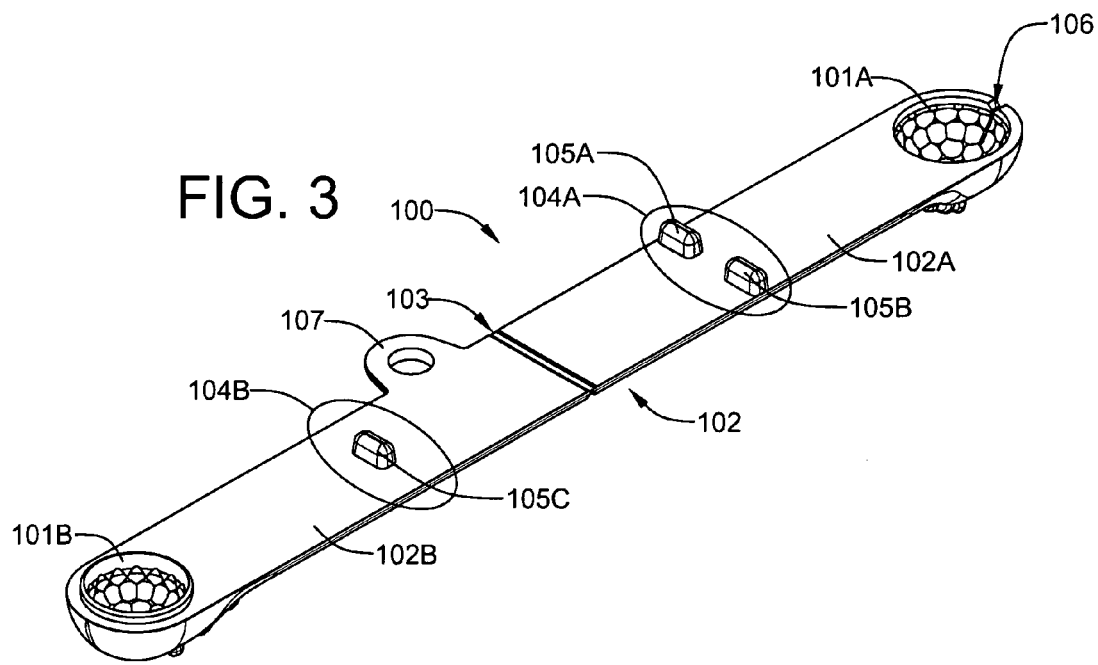
FIG. 3 is an isometric upper/non-slotted end view of the unfolded combination scoop and mold press.
Figure 4:
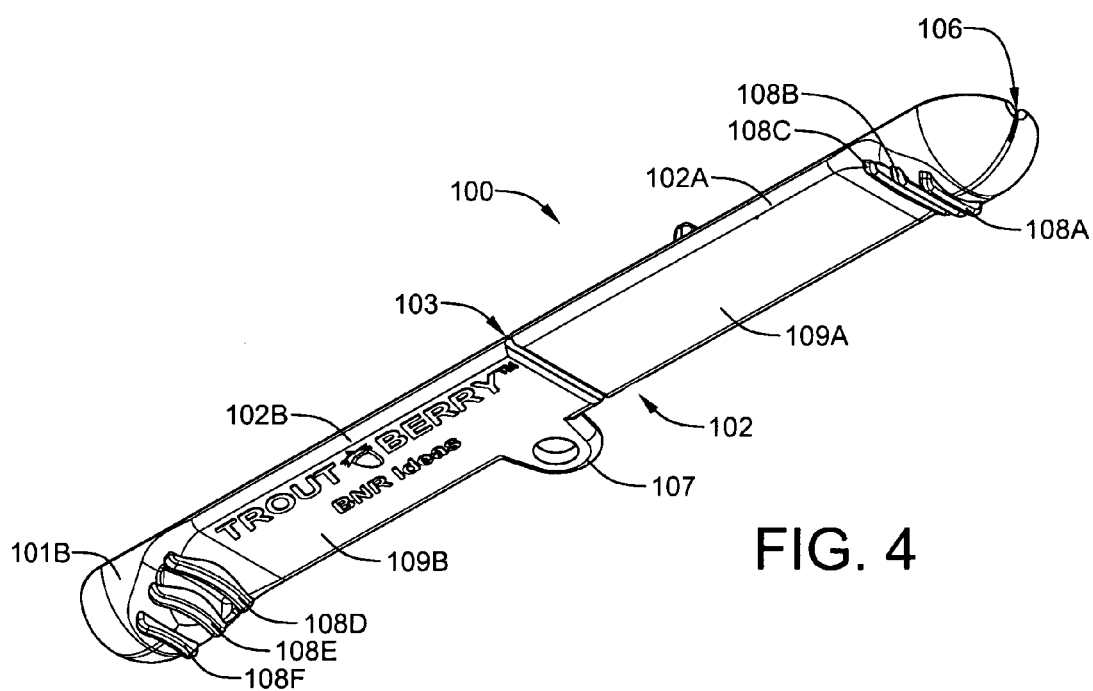
FIG. 4 is an isometric lower/slotted end view of the unfolded combination scoop and mold press.

The invention will now be described with reference to the attached drawing FIGS. 1 to 12. It should be understood that the drawing figures are not necessarily drawn to scale and are meant to be merely illustrative of the invention. FIGS. 1 to 10 show the combination scoop and mold press (hereinafter "CSMP") in an unfolded, as-molded, configuration, whereas FIGS. 11 and 12 show the CSMP in folded configurations.

Referring now to FIGS. 1 to 10, the CSMP for bait dough 100 is fabricated as a single injection molded piece of polymeric material, includes a pair of generally generally hemi-spherical, cup-shaped, or hemi-ovoid half-mold members 101A and 101B attached to opposite ends of an arm member 102, which incorporates a live hinge 103 in the center thereof which devides the arm member 102 into half-arm members 102A and 102B. A "live" or "living" hinge is a very thin strip of an injection-molded part that can be readily bent, and that will, preferably, flex thousands of times without fatiguing and breaking. While polypropylene is generally regarded as the best polymeric material for the injection molding of components incorporating live hinges, any polymeric "plastic" material that can form linear crystals (i.e., any polymeric material having long fibers) can make a reasonably good live hinge. Nylon, for example, can work if it's other properties are compatible with the desired application. However, live hinges made of nylon will have a greatly reduced number of bending cycles before failure compared to hinges made of polypropylene. As will be subsequently seen with respect to FIGS. 11 and 12, when the half-arm members are bent at the live hinge 103, the half-arm members 102A and 102B are brought from a straight angle to an acute angle so that the half-mold members 101A and 101B engage one another in mirror-image alignment to form a generally enclosed mold. In order to facilitate the mirror-image alignment of the half-mold members 101A and 101B, two sets of alignment stops 104A and 104B are positioned on the side of the arm member which fold together about the live hinge. The alignment stop sets 104A and 104B are positioned on opposite sides of the live hinge and equidistant therefrom. For a presently preferred embodiment of the invention, the first set of alignment stops 104A includes a pair of spaced-apart protrusions 105A and 105B, that project from half-arm member 102A. The second set of alignment stops 104B includes a single protrusion 105C, which fits between protrusions 105A and 105B of the first set 104A. When the arm 102 is folded to bring the half-mold members into mirror-image alignment, protrusion 105C enters the gap between protrusions 105A and 105B, so that the half-mold members 101A and 101B are aligned as they come together. It will be noted that half-mold member 101A has a slit 106 on an engaging peripheral edge thereof, through which the shank of a fish hook, or the line which is tied to a fish hook, can project. Either of the half-mold members 101A or 101B, in combination with its respective half-arm member 102A or 102B, may be utilized to scoop from a dough bait container an appropriate amount of bait dough having at least the volume of the generally enclosed mold. It will be further noted that the CSMP also includes a keyring loop 107 that is positioned along an edge of the arm member 102 adjacent the live hinge 103. Optional lateral ribs can be provided beneath each half-mold member 101A and 101B to assist a user in gripping the device while bringing the half-mold members together as the dough material is molded into bait. In addition, the lateral ribs assist a user in gripping the device when one of the half-mold members is employed as a dough scoop. Particularly in FIGS. 2, 4, 6 and 7, a first set of lateral ribs, consisting of ribs 108A, 108B, and 108C are provided beneath half-mold member 101A, whereas a second set of ribs, consisting of ribs 108D, 108E and 108F are provided beneath half-mold member 101B. It will be noted that each half-arm member 102A and 102B has a planar region 109A and 109B, respectively, on the under side thereof. A product trademark, supplier information, or company advertising may pre molded or printed on these planar regions 109A and 109B.

Figure 7:
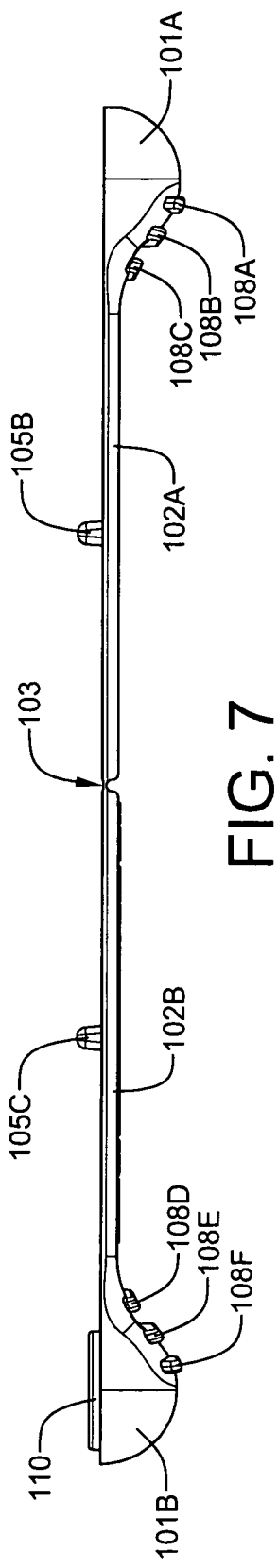
FIG. 7 is a side elevational view of the unfolded combination scoop and mold press, showing the side thereof opposite the keyring loop.
Figure 8:
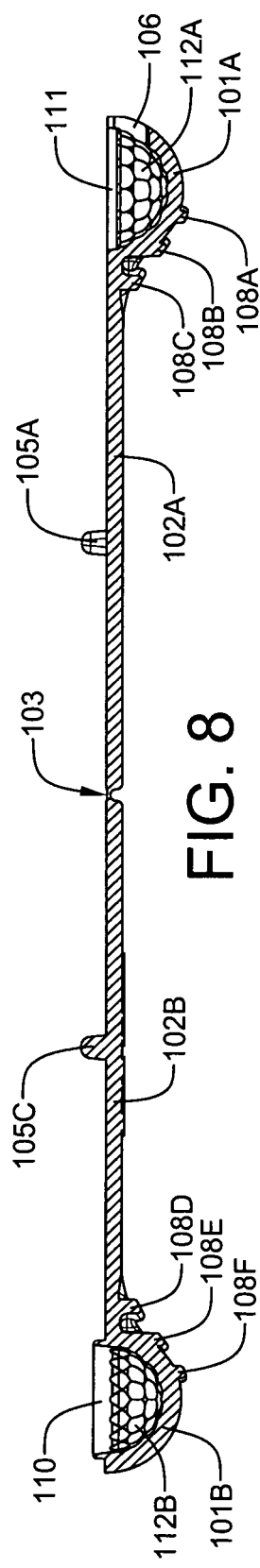
FIG. 8 is a cross sectional view of the unfolded combination scoop and mold press, taken through line 8-8 of FIG. 5.

Referring now, particularly, to FIGS. 7 and 8, half-mold member 101B has an elevated outwardly-projecting annular rim 110 that fits within an annular recess 111 in half-mold member 101A when the two half-mold members are brought together. In addition, the inner surfaces 112A and 112B of each half-mold member 101A and 101B, respectively, is dimpled to increase the surface area of a molded dough ball. The ball, instead of having dimples, will have a surface covered by projections that give molded dough balls the appearance of aggregage fruit, such as blackberries and raspberries.

Referring now to FIG. 11, the half-arm members 102A and 102B have been bent at the live hinge 103, bringing them from a straight angle characteristic of FIGS. 1 to 10 to an acute angle where protrusions 105A and 105B have meshed with protrusion 105C. It will be noted that although the axes of half-mold members 101A and 101B are aligned in a common plane, they are not coaxial. The alignment stop sets 104A and 104B prevent the axes of the half-mold members 101A and 101B from asuming a coaxial relationship with one another and prevent the half-mold members 101A and 101B from engaging one another and forming a generally enclosed spherical moldand the axes thereof from asuming a coaxial relationship if each of the half arms 102A and 102B retain a planar, unbowed configuration.

In order that the half-mold members 101A and 101B might engage one another with their axes being coincident, each of the half-arm members 102A and 102B must be flexed into a bowed configuration. As there is considerable resilience in each of the half arms 102A and 102B, the arms will spring open to release the bait once the user releases pressure on half-mold members 101A and 101B. Were alignment stops not provided, it is likely that the half-mold members 101A and 101B would be retained in a closed configuration by the stickiness of the dough bait.

Although only eight embodiments, plus several additional variations, of the combination scoop and mold press for fishing bait dough have been heretofore disclosed and described, it will be obvious to those having ordinary skill in the art that changes and modifications may be made thereto without departing from the scope and the spirit of the invention as hereinafter claimed.

What is claimed is:

1. A combination scoop and mold press comprising:
    an arm member incorporating a live hinge in a center thereof, said live hinge dividing said arm member into two half arm members; and a pair of cup-shaped half-mold members attached to opposite ends of said arm member and;
    wherein said arm member and said half-mold members are a single monolithic unit, and said half-mold members engage one another in mirror image alignment to form a generally enclosed mold when said arm member is flexed at the live hinge and the half-mold members are urged toward one another;
    wherein at least one of said cup-shaped half-mold members is equipped with a slit on an engaging peripheral edge thereof through which a shank of a fish hook, or a line tied to a fish hook projects when a barbed portion of a fish hook is positioned within the generally enclosed mold;
    wherein at least one of the half arm member is equipped with at least one protrusion about midway between a cup-shaped half-mold member and said live hinge, said at least one protrusion configured to prevent said half-mold members from engaging one another in mirror image alignment until each half-arm member is flexed into a bowed configuration by a squeezing force exerted on both half-mold members; and
    wherein a resilience of each of the half-arm members, when in said bowed configuration, causes each of the half-arm members to return to an unbowed configuration when said squeezing force is released, thereby springing open the half-mold members and releasing a dough bait ball formed therebetween.

2. The combination scoop and mold press of claim 1, wherein said arm member and said pair of half-mold members are formed as a single monolithic unit from injection-molded polymer resin.

3. The combination scoop and mold press of claim 2, wherein said injection-molded polymer resin is selected from the group consisting of polymer resins characterized as having long fibers made of linear crystals.

4. The combination scoop and mold press of claim 2, wherein said injection-molded polymer resin is polypropylene.

5. The combination scoop and mold press of claim 1, wherein there are two spaced-apart protrusions on one side of the live hinge and a single protrusion on the opposite side of the live hinge, said single protrusion fitting between the other two protrusions when the arm member is bent at the live hinge, thereby bringing said half-mold members into aligned engagement.

6. The combination scoop and mold press of claim 1, which further comprises a key ring loop unitary with one of the half-arm members.

7. The combination scoop and mold press of claim 1, wherein said arm member is equipped with at least one planar area on one or both halves thereof for the placement thereon of a product trademark, supplier information, or company advertising by either molding or printing.

8. The combination scoop and mold press of claim 1, wherein each half-mold member has a textured interior surface to increase in surface areas of the molded dough bait ball.

9. The combination scoop and mold press of claim 1, wherein one of the half-mold members is equipped with an elevated, outwardly-projecting annular rim that fits within an annular recess formed in a corresponding half-mold member when the two half-mold members are brought together.

10. A combination scoop and mold press comprising:
- an arm member incorporating a live hinge in a center thereof; and a pair of cup-shaped half-mold members attached to opposite ends of said arm member, said half-mold members engaging one another in mirror image alignment to form a generally enclosed mold when said arm member is flexed at the live hinge and the half-mold members are urged toward one another;
- wherein at least one of said cup-shaped half-mold members is equipped with a slit on an engaging peripheral edge thereof through which a shank of a fish hook, or a line tied to a fish hook projects when a barbed portion of a fish hook is positioned within the generally enclosed mold;
- wherein said arm member and said pair of cup-shaped half-mold members are formed from a single monolithic piece of polymer thermoplastic resin characterized as having fibers made of linear crystals,
- wherein said arm member is equipped with at least one protrusion about midway between a cup-shaped half-mold member and said live hinge, said at least one protrusion configured to prevent said half-mold members from engaging one another in mirror image alignment until each half-arm member is flexed into a bowed configuration by a squeezing force exerted on both half-mold members; and
- wherein a resilience of each of the half-arm members, when in said bowed configuration, causes each of the half-arm members to return to an unbowed configuration when said squeezing force is released, thereby springing open the half-mold members and releasing a dough bait ball formed therebetween.

11. The combination scoop and mold press of claim 10, wherein said injection-molded polymer resin is polypropylene.

12. The combination scoop and mold press of claim 10, wherein there are two spaced-apart protrusions on one side of the live hinge and a single protrusion on an opposite side of the live hinge, said single protrusion fitting between the other two protrusions when the arm member is bent at the live hinge, thereby bringing said half-mold members into aligned engagement.

13. The combination scoop and mold press of claim 10, wherein each half-mold member has a textured interior surface to increase in surface areas of the molded dough bait ball.

14. The combination scoop and mold press of claim 10, wherein one of the half-mold members is equipped with an elevated, outwardly-projecting annular rim that fits within an annular recess formed in a corresponding half-mold member when the two half-mold members are brought together.

* * * * *